(12) United States Patent
Nakasato

(10) Patent No.: US 8,582,537 B2
(45) Date of Patent: Nov. 12, 2013

(54) COMMUNICATION METHOD AND TERMINAL APPARATUS USING THE SAME

(75) Inventor: Yuki Nakasato, Gifu (JP)

(73) Assignee: Kyocera Corporation, Kyoto (JP)

( * ) Notice: Subject to any disclaimer, the term of this patent is extended or adjusted under 35 U.S.C. 154(b) by 354 days.

(21) Appl. No.: 12/865,122

(22) PCT Filed: Jan. 9, 2009

(86) PCT No.: PCT/JP2009/000085
§ 371 (c)(1),
(2), (4) Date: Oct. 27, 2010

(87) PCT Pub. No.: WO2009/096139
PCT Pub. Date: Aug. 6, 2009

(65) Prior Publication Data
US 2011/0051687 A1    Mar. 3, 2011

(30) Foreign Application Priority Data
Jan. 29, 2008 (JP) ................................. 2008-017620

(51) Int. Cl.
*H04B 7/00* (2006.01)
(52) U.S. Cl.
USPC ......................................... 370/333; 370/334
(58) Field of Classification Search
None
See application file for complete search history.

(56) References Cited

U.S. PATENT DOCUMENTS

| | | | | |
|---|---|---|---|---|
| 5,898,730 A | * | 4/1999 | Hensley et al. ............... | 375/224 |
| 6,760,312 B1 | * | 7/2004 | Hitzeman ..................... | 370/252 |
| 2004/0037255 A1 | * | 2/2004 | Joong et al. .................... | 370/338 |
| 2004/0147264 A1 | * | 7/2004 | Ogawa ........................... | 455/441 |
| 2005/0037756 A1 | * | 2/2005 | Yaguchi et al. ................ | 455/436 |
| 2006/0135150 A1 | * | 6/2006 | Oh ................................. | 455/425 |
| 2006/0142032 A1 | * | 6/2006 | Derakhshan et al. .......... | 455/509 |

FOREIGN PATENT DOCUMENTS

| | | | |
|---|---|---|---|
| JP | 2005-244726 | | 9/2005 |
| JP | 2006-005597 | | 1/2006 |
| JP | 2006005597 | A * | 1/2006 |
| KR | 10-2007-0105216 | | 10/2007 |
| KR | 10-0775428 | | 11/2007 |
| WO | WO-03/105518 | | 12/2003 |

OTHER PUBLICATIONS

Notification of Reason(s) for Refusal (translation) for KR 10-2010-7016923, mailed Aug. 3, 2011, 3 pages.
ARIB Standard RCR STD-28-1 "Personal Handy Phone System" Version 4.1 (1/2), pp. 10-12.
International Search Report for PCT/JP2009/000085, mailed on Apr. 14, 2009, 1 page.
International Preliminary Report on Patentability for PCT/JP2009/000085, issued Aug. 31, 2010, 5 pages.

* cited by examiner

*Primary Examiner* — Jeffrey M Rutkowski
*Assistant Examiner* — Hardikkumar Patel
(74) *Attorney, Agent, or Firm* — Duane Morris LLP

(57) ABSTRACT

A radio unit and other units communicate with a base station apparatus. The radio unit and other units are capable of performing multiple types of communications. An acquisition unit acquires communication quality and moving speed. A determination unit determines the execution of a handover based on acquired quality and moving speed. The determination unit specifies, from among acquired quality and moving speed, a parameter used to determine the execution of a handover, based on the type of performed communication. An instruction unit instructs the radio unit and other units to perform a handover.

3 Claims, 15 Drawing Sheets

FIG.4

| | | | | | |
|---|---|---|---|---|---|
| 1 | | | GS | | |
| 2 | | SS | DS | | DS |
| 3 | | SS | DS | | DS |
| 4 | | SS | DS | ......... | DS |
| 5 | | SS | DS | | DS |
| 6 | | SS | DS | | DS |
| 7 | | SS | DS | | DS |
| 8 | TS | | PS | | |
| 9 | | SS | DS | | DS |
| 10 | | SS | DS | | DS |
| 11 | | SS | DS | ......... | DS |
| 12 | | SS | DS | | DS |
| 13 | | SS | DS | | DS |
| 14 | | SS | DS | | DS |
| 15 | | | GS | | GT |
| 16 | | SS | DS | | DS |
| 17 | | SS | DS | | DS |
| 18 | | SS | DS | ......... | DS |
| 19 | | SS | DS | | DS |
| 20 | | SS | DS | | DS |
| 21 | | SS | DS | | DS |
| 22 | TS | | PS | | |
| 23 | | SS | DS | | DS |
| 24 | | SS | DS | | DS |
| 25 | | SS | DS | ......... | DS |
| 26 | | SS | DS | | DS |
| 27 | | SS | DS | | DS |
| 28 | | SS | DS | | DS |
| 29 | | | GS | | |

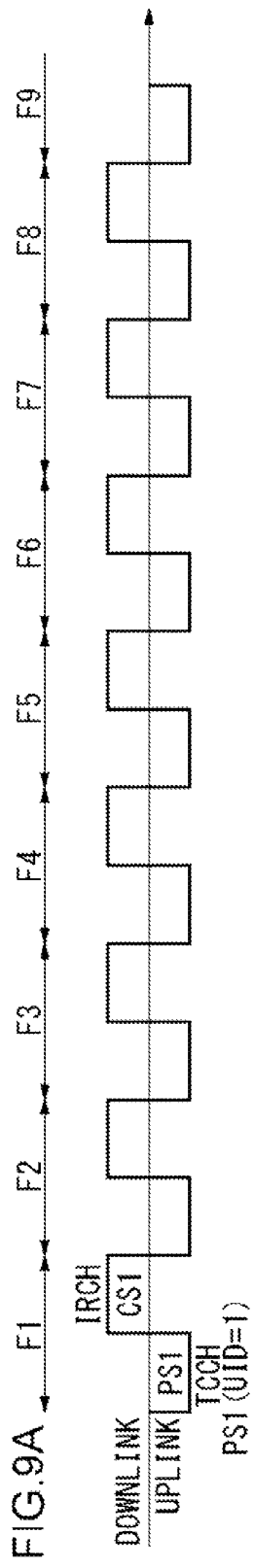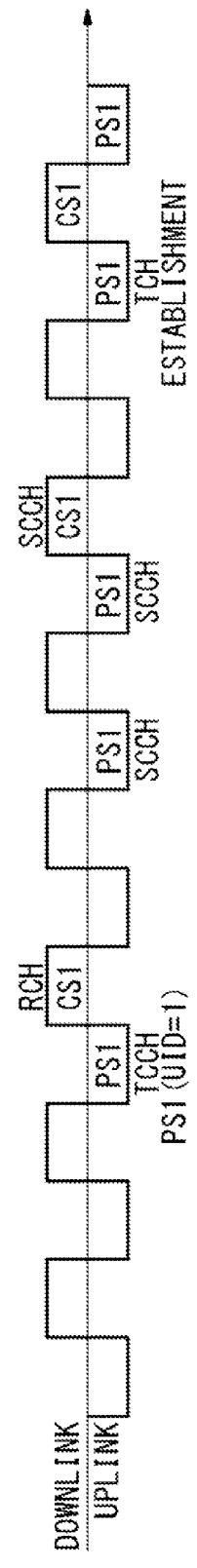

FIG.14

```
BASE STATION                                    TERMINAL
APPARATUS 1                                     APPARATUS 2
 ( START )                                       ( START )
    │─────────── TRANSMIT PCH (S100) ──────────────▶│
    │                                               │
    │─────────── TRANSMIT BCCH (S102) ──────────────▶│
    │                                               │
    │◀────── TRANSMIT TCCH TO REQUEST INITIAL RANGING (S104) ──│
    │                                               │
    │─────── TRANSMIT IRCH TO CONVEY RANGING CHANNEL (S106) ──▶│
    │                                               │
    │◀────────── TRANSMIT TCCH TO REQUEST RANGING (S108) ──────│
    │                                               │
    │─── TRANSMIT RCH TO REQUEST ADJUSTMENT
    │    OF TRANSMISSION POWER, ETC. (S110) ───────▶│
    │                                               │
    │◀────── TRANSMIT SCCH TO REQUEST RADIO RESOURCE (S112) ───│
    │                                               │
    │─────── TRANSMIT SCCH TO ALLOCATE RADIO RESOURCE (S114) ─▶│
    │                                               │
    │◀────────── TCH SYNCHRONIZATION ACHIEVED (S116) ─────────▶│
    │                                               │
 ( END )                                          ( END )
```

COMMUNICATION METHOD AND TERMINAL APPARATUS USING THE SAME

CROSS-REFERENCE TO RELATED APPLICATIONS

This is a U.S. National Phase Application of International Application No. PCT/JP2009/000085 filed Jan. 9, 2009, which claims priority to Japanese Patent Application No. 2008-017620 filed Jan. 29, 2008, the disclosures of which are incorporated herein by reference in their entirety.

TECHNICAL FIELD

The present invention relates to a wireless communication technique, and particularly to a communication method for performing a handover between base station apparatuses, and a terminal apparatus using the communication method.

BACKGROUND ART

In mobile communication systems including second generation cordless telephone systems, a logical control channel (hereinafter, referred to as an "LCCH") is defined. A base station apparatus (CS: Cell Station) assigns a time slot, which is a unit of communication, to a terminal apparatus (PS: Personal Station) so as to perform communication. When the number of group divisions is eight, a conventional LCCH consists of a broadcast control channel (hereinafter, referred to as a "BCCH"), eight paging channels (hereinafter, referred to individually as a "PCH"), and three signaling control channels (hereinafter, referred to individually as an "SCCH"), i.e., 12 channels in total. A base station apparatus transmits each channel intermittently at intervals of twenty frames (see Non-Patent Document 1, for example). One frame consists of eight time slots.

[Non-Patent Document 1] ARIB STANDARD RCR STD-28-1 "PERSONAL HANDY PHONE SYSTEM", VERSION 4.1 (1/2)

DISCLOSURE OF THE INVENTION

Problem to be Solved by the Invention

In order to increase the communication capacity of a base station apparatus in a mobile communication system as described above, the base station apparatus performs Orthogonal Frequency Division Multiple Access (OFDMA). When there is an incoming call to a terminal apparatus, a base station apparatus transmits a PCH, including a number for identifying the terminal apparatus to which the incoming call is directed (hereinafter, such a number is referred to as a "terminal number"). Upon reception of the PCH, the terminal apparatus checks if the PCH includes the terminal number of the apparatus itself. If the PCH includes the terminal number, the terminal apparatus will transmit to the base station apparatus a request for initial ranging. Such a PCH, a request signal for initial ranging, and a BCCH are different from the data itself; these correspond to control information for establishing communication and are collectively referred to as control signals.

There may be provided two types of base station apparatuses: a microcell base station apparatus and a macrocell base station apparatus. The transmission power of a macrocell base station apparatus is defined to be higher than that of a microcell base station apparatus. Accordingly, the service area of a macrocell base station apparatus is generally larger than that of a microcell base station apparatus. A frequency on which a control signal for a macrocell base station apparatus is provided (hereinafter, a frequency channel specified for a control signal is referred to as a "control channel") is defined to be different from a frequency used for a control channel on which a control signal for a microcell base station apparatus is provided.

Between a base station apparatus and a terminal apparatus are provided multiple kinds of services. For example, there is guaranteed communication including voice communication or best-effort communication including data communication. Guaranteed communication guarantees the minimum bandwidth and can be regarded as bandwidth-guaranteed communication. Meanwhile, a handover is performed in order to improve the mobility of a terminal apparatus. A handover is generally initiated when the communication quality deteriorates. Since its service area is large, a macrocell base station apparatus may possibly communicate with a large number of terminal apparatuses. If the traffic intensively increases in such a case, frequency bands assignable to the terminal apparatuses will be reduced. Also, if a terminal apparatus initiates a handover during guaranteed communication when the communication quality remains undeteriorated, the terminal apparatus may be at risk of losing the guarantee of the minimum bandwidth because of the deterioration of communication quality after the handover. Accordingly, there is required a handover technique with which the traffic can be distributed while QoS (Quality of Service) is ensured.

The present invention has been made in view of such a situation, and a purpose thereof is to provide a technique for distributing the traffic while QoS is ensured.

Means for Solving the Problem

To solve the problem above, a terminal apparatus of an embodiment of the present invention comprises: a communication unit configured to communicate with a base station apparatus; an acquisition unit configured to acquire moving speed and the quality of communication performed by the communication unit; and an instruction unit configured to determine the execution of a handover based on quality and moving speed acquired by the acquisition unit and instruct the communication unit to perform the handover. The communication unit is capable of performing a plurality of types of communications, and the instruction unit specifies, from among quality and moving speed acquired by the acquisition unit, a parameter used to determine the execution of a handover, based on the type of the communication performed by the communication unit.

Another embodiment of the present invention is a communication method. The method comprises: communicating with a base station apparatus; acquiring quality of communication and moving speed; determining the execution of a handover based on acquired quality and moving speed; and performing a handover when the execution of the handover is determined. A plurality of types of communications can be performed in the communicating, and, in the determining, a parameter used to determine the execution of a handover is specified from among acquired quality and moving speed, based on the type of performed communication.

Optional combinations of the aforementioned constituting elements, and implementations of the invention in the form of methods, apparatuses, systems, recording media, and computer programs may also be practiced as additional modes of the present invention.

Advantageous Effects

The present invention enables the distribution of the traffic while QoS is ensured.

BRIEF DESCRIPTION OF THE DRAWINGS

FIG. 4 is a diagram that shows a configuration of subchannel blocks in the communication system shown in FIG. 1;

FIGS. 9A-9B are diagrams that show time charts of step-by-step initial ranging performed by the base station apparatus shown in FIG. 6;

FIG. 14 is a sequential diagram that shows a procedure for establishing TCH synchronization in the communication system shown in FIG. 1.

Figure 1:
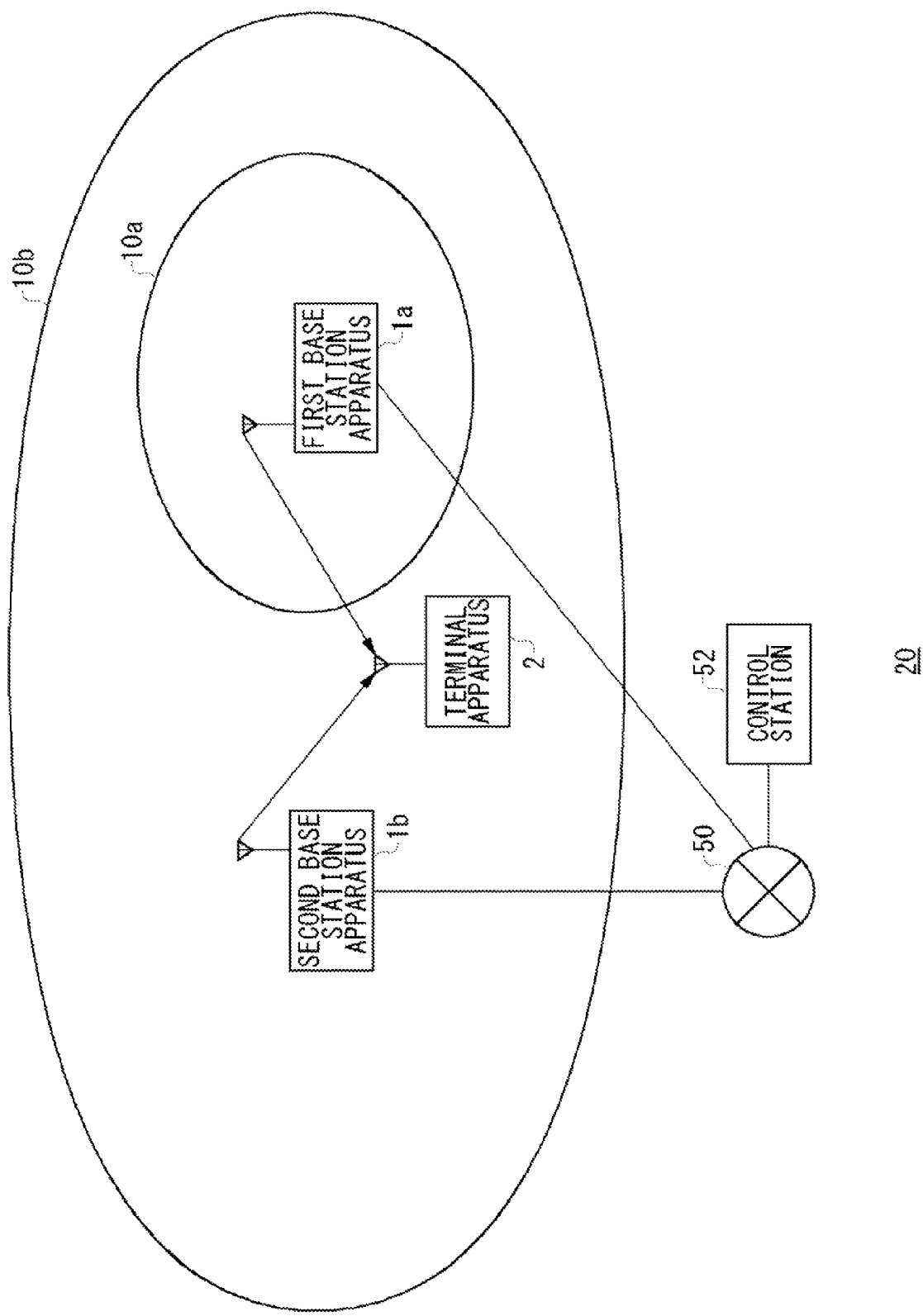
FIG. 1 is a diagram that shows a configuration of a communication system according to an embodiment of the present invention.

EXPLANATION OF REFERENCE NUMERALS 1 base station apparatus
2 terminal apparatus
10 cell
20 communication system
50 network
52 control station
100 antenna
101 radio unit
102 transmitter
103 modulator
104 receiver
105 demodulator
106 IF unit
107 control unit
110 ranging processing unit
112 assigning unit
150 radio unit
152 transmitter
154 modulator
156 receiver
158 demodulator
160 IF unit
162 control unit
164 sensor
166 acquisition unit
168 determination unit
170 instruction unit

BEST MODE FOR CARRYING OUT THE INVENTION

A general description will be given before the present invention is specifically described. An embodiment of the present invention relates to a communication system comprising a control apparatus, base station apparatuses, and terminal apparatuses. In the communication system, each frame consists of multiple time slots that are time-division multiplexed, and each time slot consists of multiple subchannels that are frequency-division multiplexed. Each subchannel is provided with a multicarrier signal. In the present embodiment, an OFDM signal is used as a multicarrier signal, and OFDMA is employed as frequency division multiplexing. A subchannel occupied by a control signal (hereinafter, referred to as a "control channel") is defined separately from a subchannel occupied by a data signal. For example, a control channel is provided on the lowest-frequency subchannel within a frequency band designated for the communication system.

In the communication system, two types of base station apparatuses may be provided, such as a macrocell base station apparatus and a microcell base station apparatus, as stated previously, and a different control channel is specified for each type. In each control channel, control signals for multiple base station apparatuses are time-division multiplexed. Also, in the communication system, guaranteed communication and best-effort communication is conducted. In order to distribute the traffic while QoS is ensured under such circumstances, the communication system according to the present embodiment performs processing as described below. A terminal apparatus initiates a handover during guaranteed communication when the communication quality deteriorates. A terminal apparatus also initiates a handover during best-effort communication when the communication quality deteriorates. In addition, even when the communication quality remains undeteriorated during best-effort communication, a terminal apparatus will initiate a handover if the moving speed varies greatly. More specifically, when the moving speed decreases, a handover from a macrocell base station apparatus to a microcell base station apparatus is initiated. Consequently, concentration of the traffic in the macrocell base station apparatus can be alleviated.

FIG. 1 shows a configuration of a communication system 20 according to the embodiment of the present invention. The communication system 20 includes: a first base station apparatus 1a and a second base station apparatus 1b, which are collectively referred to as base station apparatuses 1; a terminal apparatus 2; a network 50; and a control station 52.

As with in a second generation cordless telephone system, a base station apparatus 1 connects to multiple terminal apparatuses 2, not illustrated, using a TDMA-TDD (Time Division Multiple Access-Time Division Duplex) scheme. The first base station apparatus 1a corresponds to a macrocell base station apparatus set forth above and forms a first cell 10a, which is a macrocell. Also, the second base station apparatus 1b corresponds to a microcell base station apparatus set forth above and forms a second cell 10b, which is a microcell. The first cell 10a and the second cell 10b are collectively referred to as cells 10. The first cell 10a is larger than the second cell 10b.

The communication system also includes another base station apparatus 1, not illustrated, and the base station apparatus 1 forms another cell 10, which is also not illustrated. Further, multiple cells 10 form a paging area, which is not illustrated. A control channel for a macrocell base station apparatus and a control channel for a microcell base station apparatus are placed on different frequencies. The first base station apparatus 1a assigns a control signal on a control channel for a microcell base station apparatus, and the second base station apparatus 1b assigns a control signal on a control channel for a macrocell base station apparatus.

The control station 52 is connected to base station apparatuses 1 via the network 50. The control station 52 performs location registration of a terminal apparatus 2. Location registration is performed to manage a paging area that includes a terminal apparatus 2. Since a publicly-known technique may be used therefor, a specific description of the location registration is omitted here. The control station 52 also receives an incoming call notification for a terminal apparatus 2 using switching equipment or the like, which is not illustrated. The control station 52 then specifies the paging area that includes the terminal apparatus 2 for which the incoming call notification is provided, based on a result of the location registration. Thereafter, the control station 52 transmits the incoming call notification to a base station apparatus 1 that belongs to the paging area. In addition, when a terminal apparatus 2 performs a handover between multiple base station apparatuses 1, the control station 52 controls the operation of the base station apparatuses 1 before and after the handover. Since a publicly-known technique may be used for the control of handover operation, a specific description thereof will be omitted.

A terminal apparatus 2 communicates with a base station apparatus 1, in which two types of communications are defined: guaranteed communication and best-effort communication. As stated previously, guaranteed communication includes voice communication, and best-effort communication includes data communication. A terminal apparatus 2 also performs a handover between multiple base station apparatuses 1. For example, a terminal apparatus 2 initiates a handover when the communication quality is lowered to less than a threshold. Additionally, the terminal apparatus 2 specifies a parameter other than communication quality as a trigger to initiate a handover, depending on the communication type. Such operation will be described later.

Figure 2:
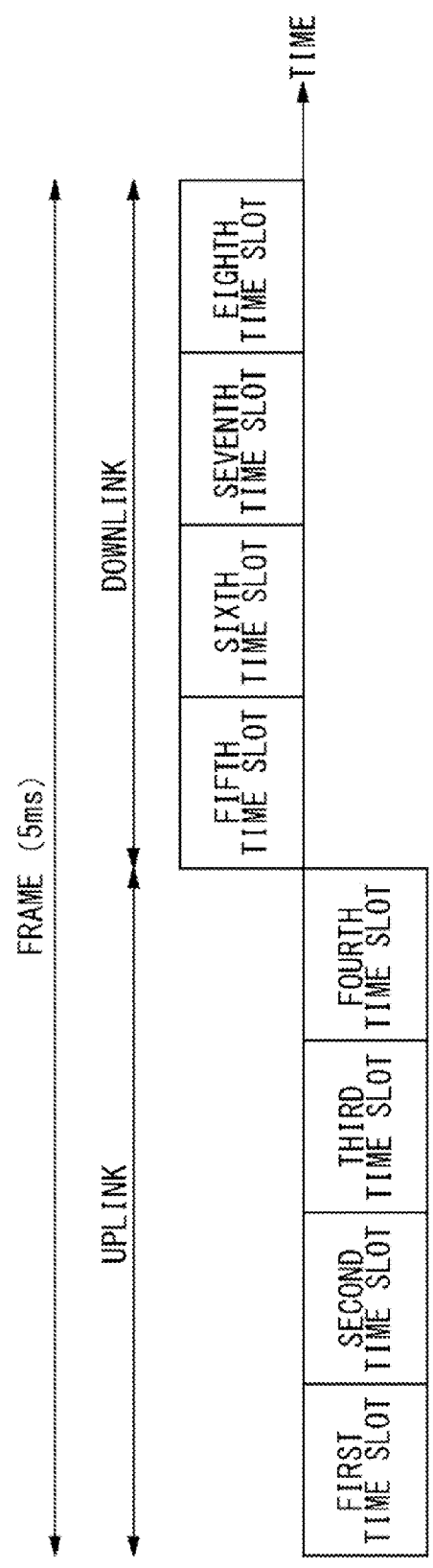
FIG. 2 is a diagram that shows a configuration of a TDMA frame in the communication system shown in FIG. 1.

FIG. 2 shows a configuration of a TDMA frame in the communication system 20. A frame consists of four time slots for uplink communication and four time slots for downlink communication in the communication system 20, as with in a second generation cordless telephone system. Frames are successively arranged. In the present embodiment, the assignment of time slots for uplink communication is performed in the same way as the assignment of time slots for downlink communication. Accordingly, in the following, a description may be given only with regard to downlink communication for the sake of convenience.

Figure 3:
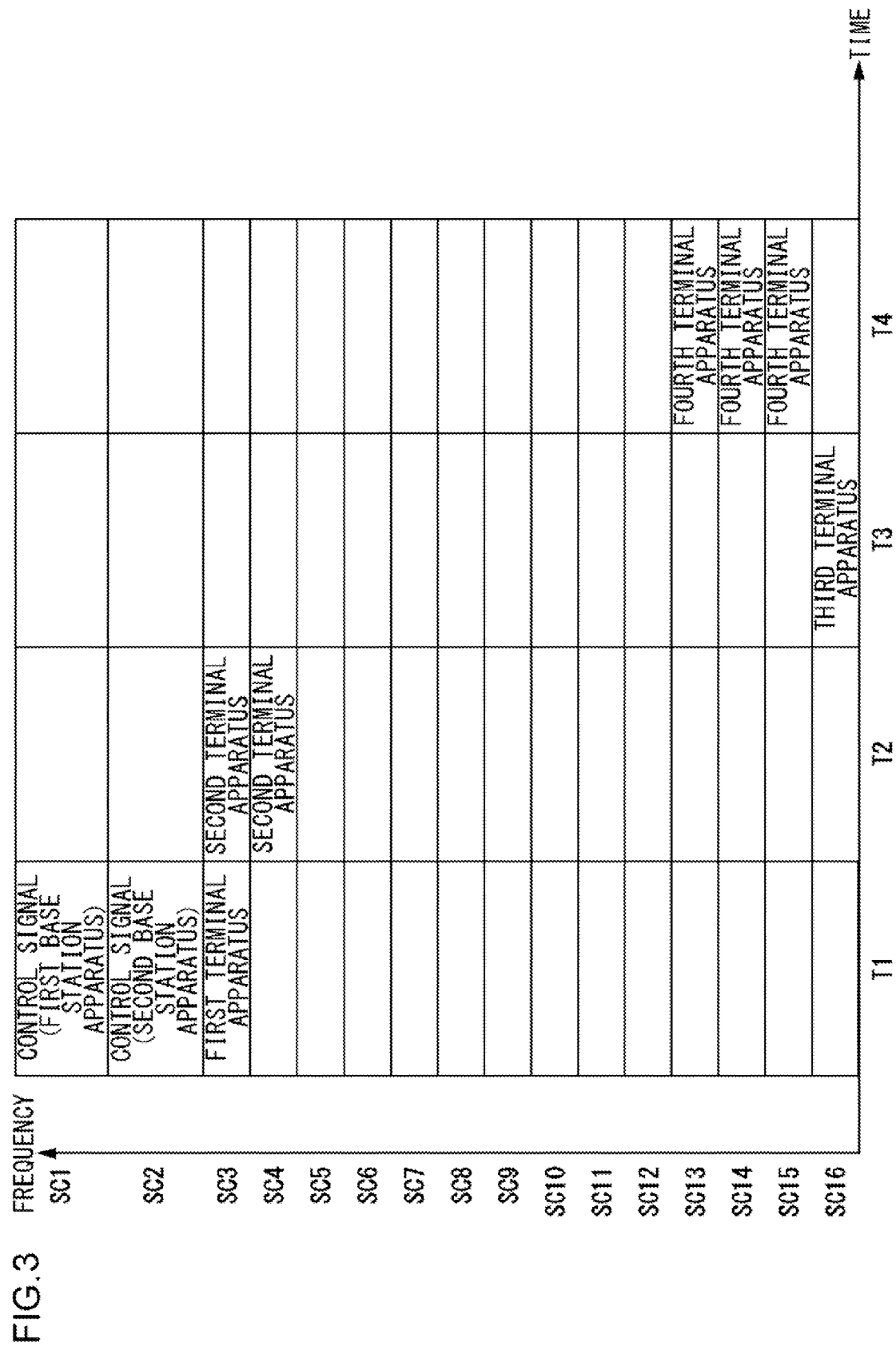
FIG. 3 is a diagram that shows a configuration of OFDMA subchannels in the communication system shown in FIG. 1.

FIG. 3 shows a configuration of OFDMA subchannels in the communication system 20. Besides TDMA as described above, the base station apparatus 1 also applies OFDMA as shown in FIG. 3. Accordingly, multiple terminal apparatuses are assigned within a single time slot. In FIG. 3, the time slot arrangement is provided on a time axis in the direction of the horizontal axis, while the subchannel arrangement is provided on a frequency axis in the direction of the vertical axis. In other words, the multiplexing on the horizontal axis corresponds to TDMA, and the multiplexing on the vertical axis corresponds to OFDMA. FIG. 3 illustrates the first time slot (denoted by "T1" in the figure) through the fourth time slot (denoted by "T4" in the figure) included in a frame. For example, T1 through T4 in FIG. 3 correspond to the fifth through eighth time slots in FIG. 2, respectively.

Each time slot includes the first subchannel (denoted by "SC1" in the figure) through the sixteenth subchannel (denoted by "SC16" in the figure). In FIG. 3, the first subchannel is designated as a control channel for the first base station apparatus 1a, i.e., a microcell base station apparatus, while the second subchannel is designated as a control channel for the second base station apparatus 1b, i.e., a macrocell base station apparatus. In FIG. 3, the first base station apparatus 1a assigns a control signal to the first subchannel in the first time slot. When only SC1 is focused on, the frame configuration or a group of multiple frames corresponds to an LCCH. Meanwhile, the second base station apparatus 1b assigns a control signal to the second subchannel in the first time slot.

Also, in FIG. 3, a first terminal apparatus 2a is assigned to the third subchannel in the first time slot, and a second terminal apparatus 2b is assigned to the third and fourth subchannels in the second time slot. Also, the third terminal apparatus 2c is assigned to the sixteenth subchannel in the third time slot, and the fourth terminal apparatus 2d is assigned to the thirteenth through fifteenth subchannels in the fourth time slot. Such subchannel assignment may be performed by the first base station apparatus 1a or the second base station apparatus 1b, and it is assumed here that the first base station apparatus 1a performs the subchannel assignment, for example.

FIG. 4 shows a configuration of subchannel blocks in the communication system 20. A subchannel block corresponds to a radio channel specified by a time slot and a subchannel. In FIG. 4, the horizontal direction represents a time axis, while the vertical direction represents a frequency axis. The numbers from "1" through "29" in the figure denote numbers of subcarriers. Thus, subchannels are provided with OFDM multicarrier signals. In FIG. 4, "TS" denotes a training symbol and includes a known signal such as an "STS", a symbol for synchronization detection, and an "LTS", a symbol for estimation of channel characteristics, both of which are not illustrated in the figure. The "GS" denotes a guard symbol in which no effective signal is provided. The "PS" denotes a pilot symbol, which is configured with a known signal. The "SS" denotes a signal symbol in which a control signal is provided. The "DS" denotes a data symbol that corresponds to data to be transmitted. The "GT" denotes guard time in which no effective signal is provided.

Figure 5:
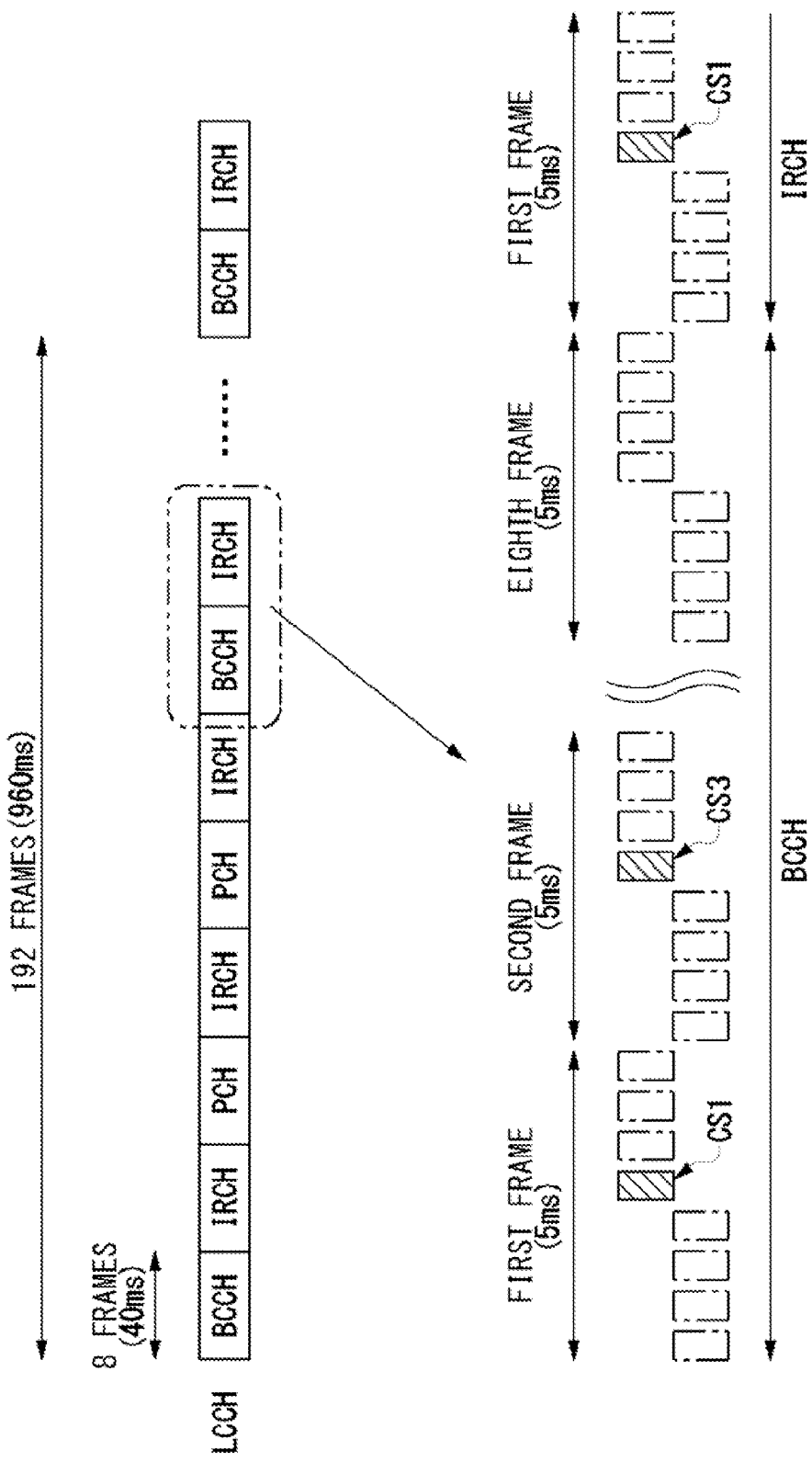
FIG. 5 is a diagram that shows a configuration of a logical control channel in the communication system shown in FIG. 1.

FIG. 5 shows a configuration of a logical control channel in the communication system 20. A logical control channel consists of four BCCHs, twelve IRCHs, and eight PCHs, i.e., 24 channels in total. Each of the BCCHs, IRCHs, and PCHs consists of eight TDMA frames (hereinafter, simply referred to as "frames"). One frame is configured as shown in FIG. 2. In FIG. 5, frames provided for a PCH, a BCCH, or an IRCH are also represented by "PCH", "BCCH", or "IRCH" for the sake of convenience. Also, although a frame is divided into multiple time slots, as stated previously, the term "PCH", "BCCH", or "IRCH" is used regardless of the unit of a time slot, a frame, or eight frames.

In the figure, "IRCH" is a channel for initial ranging used in channel assignment. Technically, "IRCH" includes "TCCH" and "IRCH", and the "TCCH" corresponds to a request for initial ranging transmitted from a terminal apparatus 2 to a base station apparatus 1. The "IRCH" corresponds to a response to such a request for initial ranging. Therefore, "TCCH" is an uplink signal, and "IRCH" is a downlink signal (hereinafter, the combination of a TCCH and an IRCH will be also referred to as an IRCH, with no distinction from an IRCH alone). The base station apparatus that has received a TCCH from a terminal apparatus performs ranging processing. Since a publicly-known technique may be used for such processing, a specific description thereof will be omitted.

In the lower part of the figure, the configuration of each frame is illustrated similarly to that in FIG. 2. This configuration also corresponds to the frame configuration in SC1 in FIG. 4. The first base station apparatus 1a of FIG. 1 transmits each of BCCHs, IRCHs, and PCHs intermittently at intervals of eight frames, using a time slot assigned for the LCCH (denoted by "CS1" in the figure) among time slots constituting the frame. More specifically, the first base station apparatus 1a uses the fifth time slot in the first frame among eight frames constituting a BCCH and also uses the fifth time slot in the first frame among eight frames constituting an IRCH.

Further, the first base station apparatus 1a uses the fifth time slot in the first frame among eight frames constituting a PCH. A third base station apparatus 1c, not illustrated in FIG. 1, is a microcell base station apparatus. The third base station apparatus 1c transmits each of BCCHs, IRCHs, and PCHs intermittently at intervals of eight frames, using, among the time slots in the frame subsequent to the frame used by the first base station apparatus 1a (the second frame in the figure), a time slot of which the position within a frame is identical with that of a time slot used by the first base station apparatus 1a (the subject time slot is denoted by "CS3" in the figure). With such a configuration, the number of base station apparatuses for which signals can be multiplexed is four downlink time slots in a frame multiplied by eight, i.e., 32 base station apparatuses at the maximum. Also, frames on SC2 in FIG. 3 may be configured in the same way.

Figure 6:
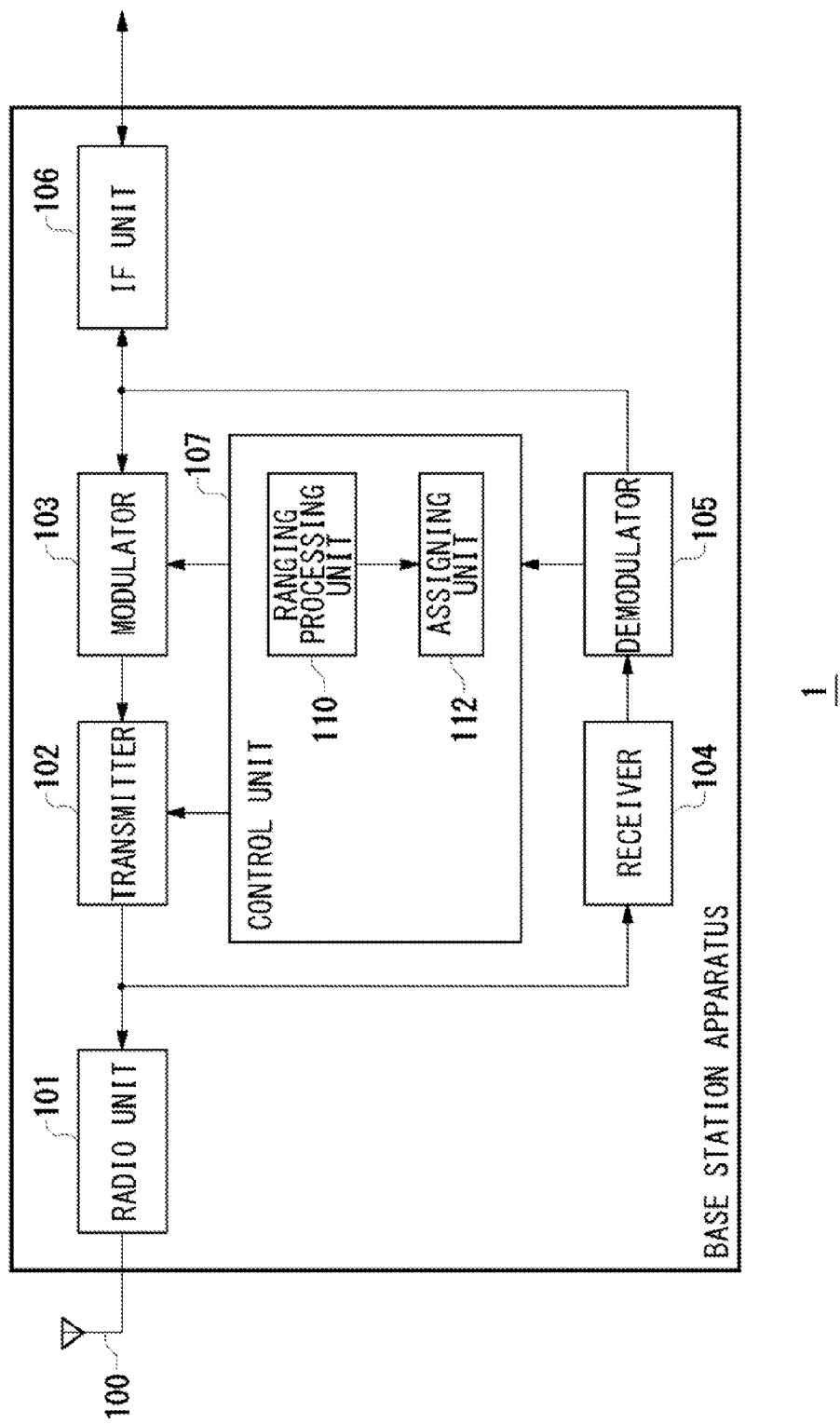
FIG. 6 is a diagram that shows a configuration of a base station apparatus shown in FIG. 1.

FIG. 6 shows a configuration of a base station apparatus 1. The base station apparatus 1 comprises an antenna 100, a radio unit 101, a transmitter 102, a modulator 103, a receiver 104, a demodulator 105, an IF unit 106, and a control unit 107. The control unit 107 includes a ranging processing unit 110 and an assigning unit 112. The base station apparatus 1 is either of the two types of base station apparatuses 1 defined in the communication system 20 shown in FIG. 1, i.e., a microcell base station apparatus or a macrocell base station apparatus.

The antenna 100 transmits and receives a radio frequency signal. To the radio frequency signal here, the theory of FIGS. 2 through 4 can be applied. As reception processing, the radio unit 101 converts the frequency of a radio frequency signal received by the antenna 100 to derive a baseband signal and outputs the resulting signal to the receiver 104. Also, as transmission processing, the radio unit 101 converts the frequency of a baseband signal transmitted by the transmitter 102 to derive a radio frequency signal and outputs the resulting signal to the antenna 100.

The transmission power of the radio unit 101 differs depending on whether the base station apparatus 1 is a microcell base station apparatus or a macrocell base station apparatus. More specifically, the transmission power of the radio unit 101 in a macrocell base station apparatus is higher than that of the radio unit 101 in a microcell base station apparatus. Although a baseband signal should be indicated by two signal lines because it generally consists of an in-phase component and a quadrature component, the signal is indicated by a single signal line in the figure in the interest of clarity.

The transmitter 102 converts a frequency domain signal transmitted by the modulator 103 into a time domain signal and outputs the resulting signal to the radio unit 101. For the conversion from a frequency domain signal into a time domain signal, an IFFT (Inversed Fast Fourier Transform) is used. The modulator 103 modulates an input from the IF unit 106 and outputs the resulting signal to the transmitter 102. As a modulation scheme therefor, BPSK (Binary Phase Shift Keying), QPSK (Quadrature Phase Shift Keying), 16 QAM (Quadrature Amplitude Modulation), 64 QAM, 256 QAM, or the like is used.

The receiver 104 converts a time domain signal transmitted by the radio unit 101 into a frequency domain signal and outputs the resulting signal to the demodulator 105. For the conversion from a time domain signal into a frequency domain signal, an FFT (Fast Fourier Transform) is used. The demodulator 105 demodulates an input from the receiver 104 and outputs the resulting signal to the IF unit 106. On this occasion, demodulation corresponding to the modulation is performed. The IF unit 106 is connected to a network 50, not illustrated, and outputs to the network 50, as reception processing, a signal demodulated by the demodulator 105. Also, as transmission processing, the IF unit 106 receives data from the network 50 and outputs it to the modulator 103. Furthermore, the IF unit 106 accepts an incoming call notification from the control station 52, not illustrated, via the network 50, also not illustrated. The IF unit 106 then outputs the incoming call notification thus accepted to the control unit 107.

The control unit 107 performs the overall timing control for the base station apparatus 1. The control unit 107 also configures an LCCH as shown in FIG. 5 and intermittently transmits it to a terminal apparatus 2. The ranging processing unit 110 controls the times at which LCCHs including BCCHs are sequentially transmitted through the modulator 103, transmitter 102, radio unit 101, and antenna 100. The ranging processing unit 110 cyclically assigns LCCHs, which are control signals, to a predetermined subchannel, i.e., a control channel. If the base station apparatus 1 is a microcell base station apparatus, the ranging processing unit 110 will use the first subchannel as the control channel. If the base station apparatus 1 is a macrocell base station apparatus, on the other hand, the ranging processing unit 110 will use the second subchannel as the control channel.

The ranging processing unit 110 also cyclically selects a time slot in a control channel and assigns an LCCH to the time slot thus selected. For the selection of a time slot, a publicly-known technique may be used; for example, the receiver 104 may measure the amount of interference power in each time slot, and the ranging processing unit 110 may then select a time slot with the minimum interference power. The ranging processing unit 110 assigns an LCCH to a time slot within eight frames, as shown in FIG. 5. On such an occasion, the ranging processing unit 110 assigns, as an LCCH, a BCCH, an IRCH, a PCH, an IRCH, a PCH, and an IRCH in this order.

The ranging processing unit 110 allows the modulator 103, transmitter 102, and radio unit 101 to convey an assigned LCCH. Furthermore, the transmission power used to convey an LCCH also differs depending on whether the base station apparatus 1 is a microcell base station apparatus or a macrocell base station apparatus. Since the transmission power of the radio unit 101 in a macrocell base station apparatus is higher than that of the radio unit 101 in a microcell base station apparatus, an LCCH from a macrocell base station apparatus is conveyed with higher transmission power than an LCCH from a microcell base station apparatus. The ranging processing unit 110 generates a PCH as an incoming call signal based on an incoming call notification received by the IF unit 106. The ranging processing unit 110 then conveys the PCH through the modulator 103, transmitter 102, radio unit 101, and antenna 100.

Figure 7:
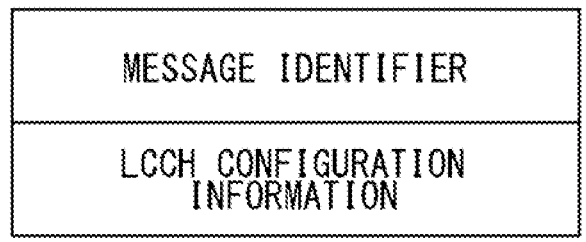
FIG. 7 is a diagram that shows a message format of a BCCH transmitted from the base station apparatus shown in FIG. 6.
Figure 8:
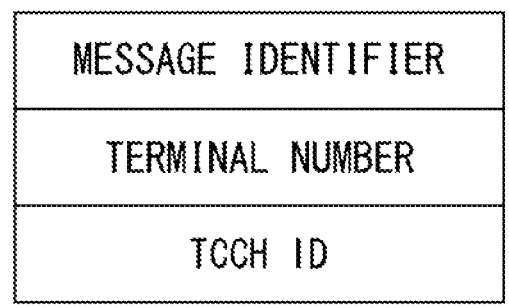
FIG. 8 is a diagram that shows a message format of a PCH transmitted from the base station apparatus shown in FIG. 6.

FIG. 7 shows a message format of a BCCH transmitted from a base station apparatus 1. A BCCH includes a message identifier for identifying the type of the message, and LCCH configuration information that specifies a parameter for defining the configuration of the logical control channel, such as an interval value, paging groups, and a battery saving cycle maximum value. FIG. 8 shows a message format of a PCH transmitted from a base station apparatus 1. A PCH includes a message identifier for identifying the type of the message, and the number of a terminal apparatus to which an incoming call has been provided. The PCH also includes a TCCH ID. Upon reception of a PCH as the notification of an incoming call, a terminal apparatus 2 requests initial ranging from the base station apparatus 1 that has sent the PCH. The description will now return to FIG. 6.

Upon reception of a TCCH from a terminal apparatus 2, the ranging processing unit 110 adjusts the transmission power or the timing of transmission for the terminal apparatus 2 using a publicly-known technique. The ranging processing unit 110 then repeatedly provides a ranging response including the adjustment result, such as performing ranging processing of transmitting an IRCH, multiple times. Such processing will be detailed using FIGS. 9A-9B. FIGS. 9A-9B show time charts of step-by-step initial ranging performed by a base station apparatus 1. The frames are assigned numbers serially from top to bottom for the sake of convenience, and the frames 1 through 9 are denoted by "F1" through "F9". Also, in the interest of clarity, FIG. 9 only depict the first time slot in each of the uplink and downlink within each frame shown in FIG. 2.

For example, if the base station apparatus 1 is a microcell base station apparatus, the ranging processing unit 110 will define the timing of first receiving a TCCH and transmitting an IRCH using a frequency band to which a PCH or a BCCH for each base station apparatus 1 is cyclically assigned, i.e., SC1 in FIG. 3, as described previously. FIG. 9A shows the operation in SC1. Since similar operation is performed also in SC2, the explanation thereof is omitted. A terminal apparatus 2 receives a BCCH, not illustrated, and identifies a base station apparatus 1 to connect to. The terminal apparatus 2 then transmits a TCCH in F1. The terminal apparatus 2 may receive a PCH, and in such a case, the terminal apparatus 2 receives the PCH before receiving the BCCH.

There are defined multiple kinds of waveform patterns for TCCHs. More specifically, a waveform pattern is defined when part of multiple subcarriers are selected; therefore, by changing the subcarrier to be selected, multiple kinds of waveform patterns are defined. Accordingly, even when simultaneously receiving TCCHs from multiple terminal apparatuses 2, the ranging processing unit 110 can distinguish between the terminal apparatuses 2 as long as the waveform patterns of the TCCHs are different from each other. In other words, the collision probability of TCCHs can be reduced. A terminal apparatus 2, not illustrated, randomly selects one of the multiple kinds of waveform patterns thus defined.

Figure 10:
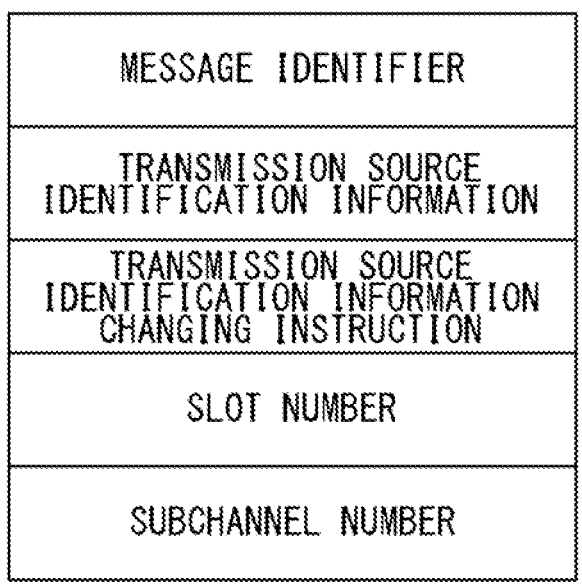
FIG. 10 is a diagram that shows a message format of an IRCH transmitted from the base station apparatus shown in FIG. 6.

FIG. 10 shows a message format of an IRCH transmitted from a base station apparatus 1. An IRCH includes a message identifier for identifying the type of the message, information for identifying a transmission source that has requested initial ranging, a transmission source identification information changing instruction for ordering the change of the transmission source identification information to a value different from the value specified at the time of the first initial ranging request, and information (a slot number and a subchannel number) for specifying a data transfer channel (hereinafter, referred to as a TCH) on which the second TCCH is to be transmitted. A TCH is assigned to a subchannel other than SC1 or SC2 in FIG. 3. In the following, a communication channel used for communication will be also referred to as a TCH, but the term "TCH" is used with no distinction. The transmission source identification information is a value predetermined so that, even when initial ranging requests are simultaneously transmitted from multiple terminal apparatuses 2, the base station apparatus 1 can distinguish between the terminal apparatuses 2 by performing a predetermined operation on the value. The description will now return to FIG. 9B.

The ranging processing unit 110 defines the timing of receiving the second or a subsequent TCCH from the terminal apparatus 2, in the previous ranging response, such as the IRCH. The ranging processing unit 110 defines the timing of receiving the second or a subsequent TCCH and transmitting the second or a subsequent ranging response using a frequency band to which a TCH for each base station apparatus 1 is adaptively assigned, such as each of SC3 through SC16 in FIG. 3. FIG. 9B corresponds to a time chart of the operation in a subchannel specified by the IRCH, and the ranging processing unit 110 receives a TCCH and transmits an RCH as a ranging response thereto in F3.

Figure 11:
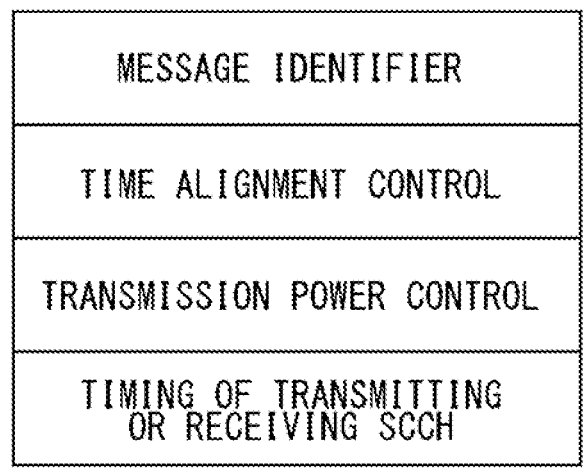
FIG. 11 is a diagram that shows a message format of an RCH transmitted from the base station apparatus shown in FIG. 6.

FIG. 11 shows a message format of an RCH transmitted from a base station apparatus 1. An RCH includes a message identifier for identifying the type of the message, control information for synchronization (timing alignment control and transmission power control), and a timing of transmitting or receiving an SCCH, which specifies the time of initiation of a request for radio resource allocation. The terminal apparatus 2 adjusts the time difference by timing alignment control and adjusts the transmission power by transmission power control so as to achieve synchronization with the base station apparatus 1 before requesting radio resource allocation. The description will now return to FIG. 9B.

It is assumed here that F5 and F6 are specified by the RCH to transmit and receive SCCHs, as shown in FIG. 9B. 0 The assigning unit 112 then transmits, in F5 shown in FIG. 9B, an SCCH including the assignment result. Thus, the assigning unit 112 performs channel assignment for a terminal apparatus 2 to which an IRCH has been transmitted, using a frequency band other than that to which the ranging processing unit 110 assigns a BCCH, a PCH, or the like.

Figure 12:
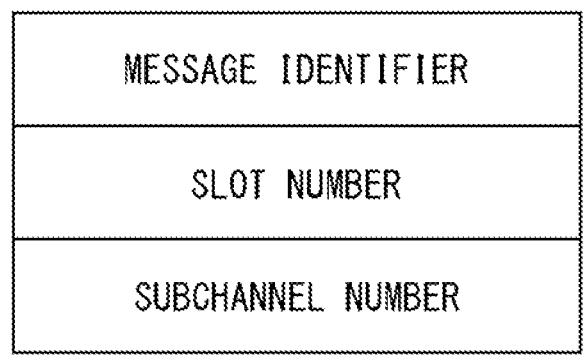
FIG. 12 is a diagram that shows a message format of an SCCH transmitted from the base station apparatus shown in FIG. 6.

FIG. 12 shows a message format of an SCCH transmitted from a base station apparatus 1. An SCCH includes a message identifier for identifying the type of the message, and information (a slot number and a subchannel number) for specifying a TCH assigned to the terminal apparatus 2. In this way, an initial ranging request is processed step by step; the base station apparatus responds to the first initial ranging request using an LCCH, and, thereafter, the apparatus responds to the second initial ranging request and radio resource allocation request using a TCH. Accordingly, channel assignment for multiple terminal apparatuses can be performed at the same time, and the terminal apparatuses can be accurately distinguished without preparing multiple pieces of transmission source identification information. The description will now return to FIG. 9B. It is assumed here that a TCH after F8 is specified by the SCCH, as shown in FIG. 9B. After the assigning unit 112 assigns the TCH, the control unit 107 starts communication with the terminal apparatus 2. Even if the base station apparatus 1 is a base station apparatus 1 after a handover, the same processing as described above will be performed. Accordingly, the explanation for such a case is omitted here.

The configuration above may be implemented by a CPU or the memory of any given computer, an LSI, or the like in terms of hardware, and by a memory-loaded program having a communication function or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 13:
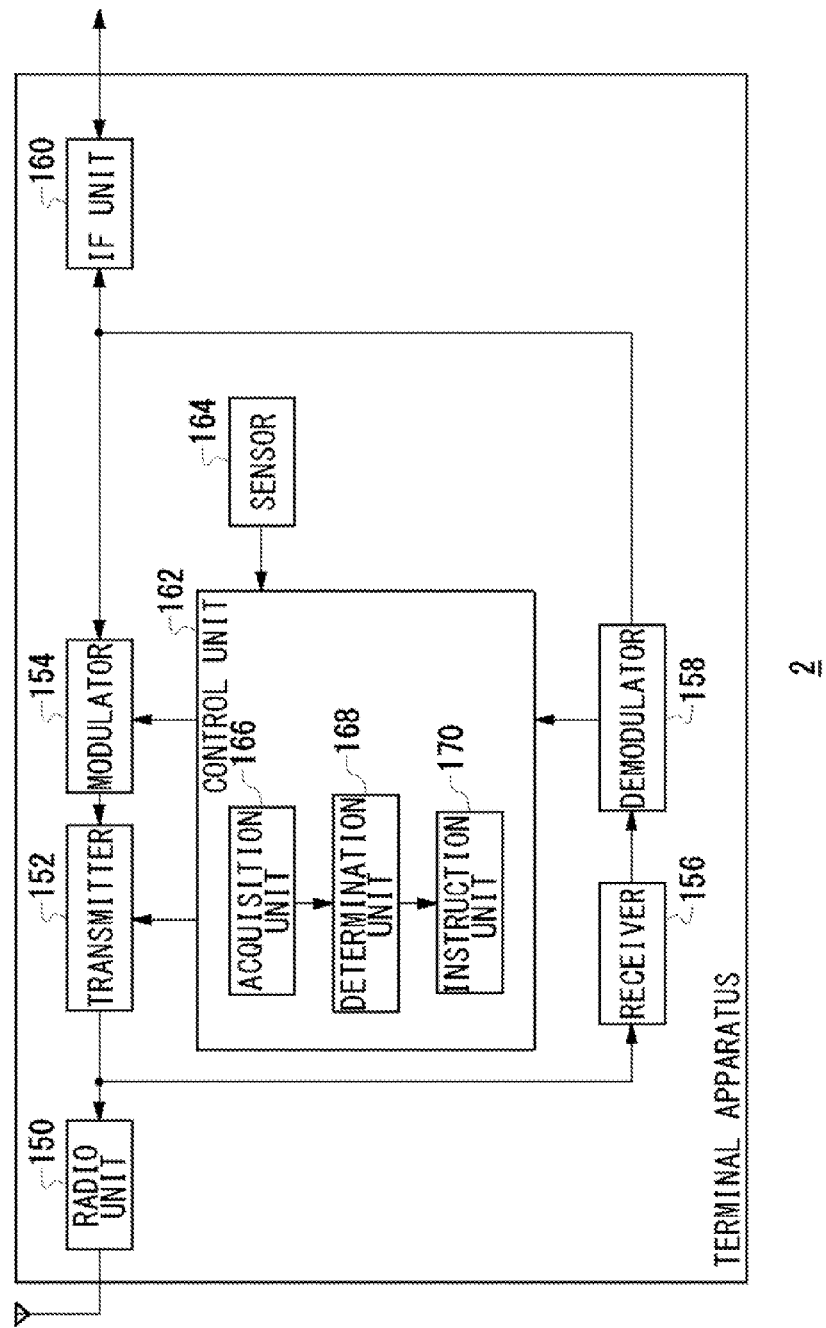
FIG. 13 is a diagram that shows a configuration of the terminal apparatus shown in FIG. 1.

FIG. 13 shows a configuration of a terminal apparatus 2. The terminal apparatus 2 comprises a radio unit 150, a transmitter 152, a modulator 154, a receiver 156, a demodulator 158, an IF unit 160, a control unit 162, and a sensor 164. The control unit 162 includes an acquisition unit 166, a determination unit 168, and an instruction unit 170.

Since the radio unit 150, transmitter 152, modulator 154, receiver 156, and demodulator 158 correspond to the radio unit 101, transmitter 102, modulator 103, receiver 104, and demodulator 105, respectively, the explanation thereof is omitted. The communication with a base station apparatus 1 is performed via the radio unit 150 and other units. At the time, processing corresponding to the radio resource allocation performed by the base station apparatus 1, as mentioned previously, is performed. The radio unit 150 and other units can perform multiple types of communications including guaranteed communication and best-effort communication. As stated previously, guaranteed communication includes voice communication and is regarded as communication in which the guarantee of the minimum bandwidth is required. Best-effort communication includes data communication, also as stated previously, but is regarded as communication in which the guarantee of the minimum bandwidth is not required.

The communication target of the radio unit 150 and other units is the first base station apparatus 1a defined in the communication system 20, i.e., a microcell base station apparatus, or the second base station apparatus 1b defined in the same communication system 20 in which the first base station apparatus 1a is defined, i.e., a macrocell base station apparatus. The radio unit 150 and other units also perform a handover between base station apparatuses 1 according to an instruction from the control unit 162. The IF unit 160 consists of a microphone, a speaker, a keyboard, and a display, and the unit receives information from or provides information to a user. The IF unit 160 may also be connected to a PC, not illustrated, and may transmit or receive information to or from the PC. For example, the microphone and speaker may be used for guaranteed communication described above, while the keyboard and display may be used for best-effort communication.

The sensor 164 measures the moving speed of the terminal apparatus 2. Since a publicly-known technique may be used for the measurement of moving speed, a specific description thereof is omitted here. The sensor 164 regularly outputs the measurement result to the acquisition unit 166. The sensor 164 may output the measurement result when the variation of the measurement result is greater than a threshold. The acquisition unit 166 acquires a moving speed from the sensor 164. The acquisition unit 166 also receives data demodulated by the demodulator 158 and measures the error rate thereof. Based on the error rate, the acquisition unit 166 acquires communication quality. The acquisition unit 166 may receive information other than error rates as communication quality. Examples of such information may be EVM (Error Vector Magnitude) and received power.

The determination unit 168 determines the execution of a handover based on the quality and moving speed acquired by the acquisition unit 166. The instruction unit 170 identifies, in advance, the type of communication performed by the radio unit 150 and other units, i.e., guaranteed communication or best-effort communication. Based on the communication type, the determination unit 168 specifies, from among the quality and moving speed acquired by the acquisition unit 166, a parameter used to determine the execution of a handover. For example, when guaranteed communication is performed, the determination unit 168 selects quality as the parameter. Accordingly, when the quality is lowered to less than a threshold, the determination unit 168 determines the execution of a handover.

When best-effort communication is performed, on the other hand, the determination unit 168 selects quality and moving speed as the parameters. That is, the determination unit 168 performs the same processing as in the case of guaranteed communication with regard to quality, and determines the execution of a handover also when the moving speed varies greatly. More specifically, the determination unit 168 calculates the absolute value of the difference between the current moving speed and the moving speed measured a predetermined period of time ago. If the absolute value of the difference is greater than a threshold, the determination unit 168 will determine the execution of a handover. When determining the execution of a handover, the determination unit 168 outputs the determination result to the instruction unit 170. When both guaranteed communication and best-effort communication is performed, the determination unit 168 selects a parameter in the same way as when only guaranteed communication is performed.

Upon receiving from the determination unit 168 an instruction to perform a handover, the instruction unit 170 specifies the base station apparatus 1 to communicate with after the handover. For example, the instruction unit 170 allows the radio unit 150, receiver 156, and demodulator 158 to receive a BCCH to recognize at least one base station apparatus 1 located circumferentially around the terminal apparatus. When the current moving speed is higher than a threshold, the instruction unit 170 preferentially selects a macrocell base station apparatus from among the recognized base station apparatuses 1. If there are multiple available macrocell base station apparatuses, the instruction unit 170 will select a macrocell base station apparatus therefrom based on the received power.

When the current moving speed is not higher than the threshold, on the other hand, the instruction unit 170 preferentially selects a microcell base station apparatus from among the recognized base station apparatuses 1. If the selected base station apparatus 1 is identical with the base station apparatus 1 that the terminal apparatus has connected to so far, the instruction unit 170 will determine the cancellation of the handover. Finally, the instruction unit 170 instructs the radio unit 150 and other units to perform a handover to the selected base station apparatus 1. Since a handover may be performed in a similar way as radio resource allocation, a specific description thereof will be omitted.

There will now be described the operation performed by the communication system 20 having the configuration set forth above. FIG. 14 is a sequential diagram that shows a procedure for establishing TCH synchronization in the communication system 20. A base station apparatus 1 includes the terminal number of a terminal apparatus 2 in a PCH and transmits the PCH at the same time as other base station apparatuses belonging to the paging area transmit PCHs (S100). The base station apparatus 1 then transmits a BCCH at a predetermined timing (S102). When a terminal apparatus 2 receives the PCH and learns that the PCH includes the terminal number of the apparatus itself, the terminal apparatus 2 identifies the base station apparatus 1 based on the BCCH, includes transmission source identification information in a TCCH, and transmits the TCCH to the base station apparatus CS1, thereby requesting the first initial ranging (S104). The base station apparatus CS1 then separates the transmission source identification information UID of the terminal apparatus 2 from the received TCCH and assigns the terminal apparatus 2 to an unoccupied TCH.

Thereafter, the base station apparatus includes, in an IRCH, the slot number and subchannel number of the TCH thus assigned and transmits the IRCH to the terminal apparatus 2, thereby notifying the terminal apparatus 2 of the TCH on which the second initial ranging will be performed (S106). The terminal apparatus 2 then includes transmission source identification information in a TCCH and transmits the TCCH to the base station apparatus 1 using the TCH assigned for initial ranging, thereby requesting the second initial ranging (S108). Subsequently, the base station apparatus 1 performs ranging processing using the TCH assigned for the terminal apparatus 2. The base station apparatus 1 then includes, in an RCH, time alignment control, transmission power control, and the timing of transmitting and receiving SCCHs, and transmits the RCH to the terminal apparatus 2, thereby requesting adjustment of transmission power, etc. (S110). Accordingly, the terminal apparatus 2 extracts from the received RCH an adjustment value required by the base station apparatus 1 and adjusts the transmission power, etc.

Thereafter, the terminal apparatus 2 requests radio resource allocation from the base station apparatus 1 using the TCH assigned for initial ranging (S112). The base station apparatus 1 performs FEC decoding or the like on the message for requesting radio resource allocation sent from the terminal apparatus PS1 before assigning an unoccupied TCH to the terminal apparatus 2. The base station apparatus 1 then includes, in an SCCH, the slot number and subchannel number of the TCH thus assigned and transmits the SCCH to the terminal apparatus 2 (S114). Since the synchronization of the TCH is achieved by this step, the base station apparatus 1 and terminal apparatus 2 will transmit data to each other using the synchronized TCH from then on (S116).

Figure 15:
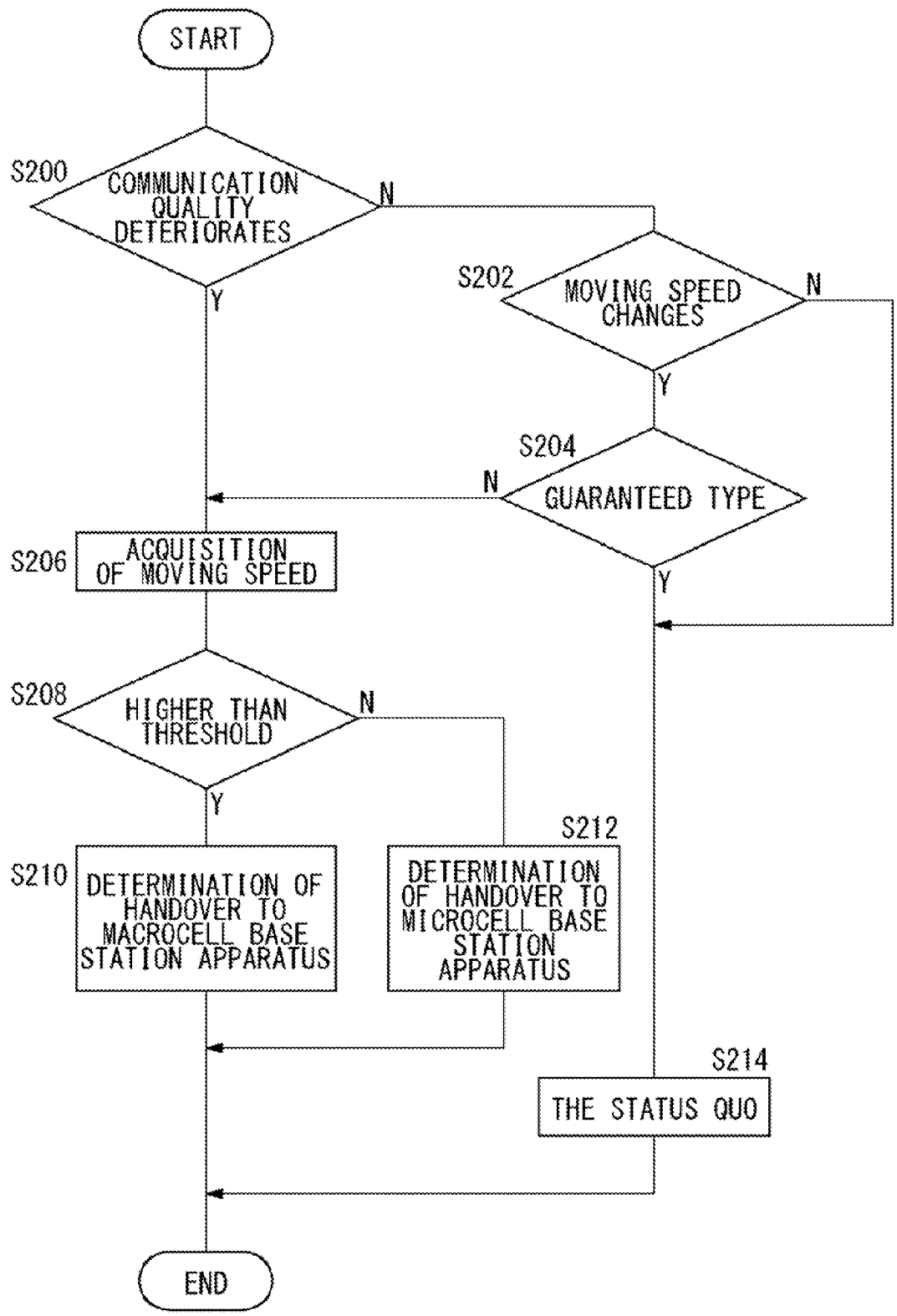
FIG. 15 is a flowchart that shows the procedure of a handover performed by the terminal apparatus shown in FIG. 13.

FIG. 15 is a flowchart that shows the procedure of a handover performed by a terminal apparatus 2. When the communication quality remains undeteriorated (N at S200), if the moving speed varies (Y at S202) while guaranteed communication is performed (Y at S204), the determination unit 168 will determine to maintain the present state (S214). If the moving speed remains unchanged (N at S202), the determination unit 168 will also determine to maintain the present state (S214). If the communication quality deteriorates (Y at S200) or if guaranteed communication is not performed (N at S204), the determination unit 168 will determine the initiation of a handover. The instruction unit 170 will then acquire the moving speed (S206). If the moving speed is higher than a threshold (Y at S208), the instruction unit 170 will determine a handover to a macrocell base station apparatus (S210). On the other hand, if the moving speed is not higher than the threshold (N at S208), the instruction unit 170 will determine a handover to a microcell base station apparatus (S212).

According to the embodiment of the present invention, since a parameter used to determine the execution of a handover is specified from among communication quality and moving speed based on the communication type, the traffic can be distributed while QoS is ensured. Since communication quality is used to determine the execution of a handover during guaranteed communication, the communication quality can be maintained. Also, since moving speed is not used to determine the execution of a handover during guaranteed communication, the execution of a handover can be restrained, thereby preventing deterioration of communication quality. Meanwhile, since moving speed is used regardless of the communication quality during best-effort communication, a handover can be actively performed. Since a handover is actively performed, the traffic can be distributed. Also, since a microcell base station apparatus is selected when the moving speed is low, concentration of the traffic in a macrocell base station apparatus can be restrained. Further, since a control channel for a macrocell base station apparatus and a control channel for a microcell base station apparatus are provided on different subchannels, processing in terminal apparatuses can be simplified.

Since the first TCCH and IRCH are assigned to a frequency band to which cyclic signals, such as a BCCH and a PCH, are assigned and in which signals for multiple base station apparatuses are time-division multiplexed, a collision between TCCHs or a collision with a TCH for another base station apparatus can be prevented. Also, with such an arrangement, a dedicated subchannel for initial ranging will be unnecessary. Since a dedicated subchannel for initial ranging is unnecessary, the transmission efficiency can be improved. In addition, since multiple ranging processes are performed step by step, multiprocessing of TCCHs is enabled. Also, since multiple ranging processes are performed step by step, channels can be assigned to multiple terminal apparatuses. Further, since channel assignment processing is scheduled using time-division multiplexing, channels can be assigned to multiple terminal apparatuses.

Also, since channel assignment processing is scheduled using time-division multiplexing, adaptive array transmission can be performed. In addition, since the first TCCH and IRCH are arranged between broadcasting signals, such as a BCCH and a PCH, the period of transmitting or receiving the first TCCH or IRCH can be reduced. Since the period of transmitting or receiving the first TCCH or IRCH is reduced, the period between the recognition of an incoming call via a PCH and the initiation of communication can be reduced. Since the period between the recognition of an incoming call via a PCH and the initiation of communication is reduced, the responsiveness to the incoming call can be improved. Also, since the period of transmitting or receiving the first TCCH or IRCH is reduced, channel assignment can be performed at a higher speed. Further, since a TCCH is arranged with respect to a BCCH, an IRCH, or a PCH, the opportunity of a terminal apparatus to transmit a TCCH can be increased. Since the opportunity of a terminal apparatus to transmit a TCCH is increased, the period of channel assignment processing can be reduced.

The present invention has been described with reference to the embodiment. The embodiment is intended to be illustrative only, and it will be obvious to those skilled in the art that various modifications to constituting elements or processes could be developed and that such modifications also fall within the scope of the present invention.

In the embodiment of the present invention, a control channel for a macrocell base station apparatus and a control channel for a microcell base station apparatus are provided on different subchannels. However, applications are not limited thereto, and such control channels may be provided on the same subchannel. In this case, a BCCH or a PCH includes information for conveying the type of the base station apparatus 1. Based on the information, a terminal apparatus 2 determines whether the base station apparatus 1 is a macrocell base station apparatus or a microcell base station apparatus. Therefore, according to this modification, subcarriers designated as control channels can be reduced, thereby increasing frequency bands used for data transmission.

In the embodiment of the present invention, the determination unit 168 and instruction unit 170 determine a parameter based on the communication type. However, applications are not limited thereto, and the determination unit 168 and instruction unit 170 may determine a parameter regardless of the communication type, for example. Besides the processing described above, the instruction unit 170 determines the execution of a handover to a microcell base station apparatus regardless of the communication quality when the moving speed is lower than a threshold for a predetermined period of time. Such processing may be performed only when the terminal apparatus is currently connecting to a macrocell base station apparatus. According to this modification, concentration of the traffic in a macrocell base station apparatus can be further restrained by allowing a terminal apparatus 2 to connect to a microcell base station apparatus when the terminal apparatus remains almost stationary.

In the embodiment of the present invention, the communication system 20 performs two types of communications, i.e., guaranteed communication and best-effort communication. However, the types are not limited thereto, and communication of a type other than these two types may be performed. In such a case, communication quality and moving speed is appropriately used as a parameter depending on the communication type. Accordingly, this modification makes the present invention applicable to various types of communications.

INDUSTRIAL APPLICABILITY

The present invention enables the distribution of the traffic while QoS is ensured.

The invention claimed is:

1. A terminal apparatus, comprising:
a communication unit configured to communicate with a base station apparatus;
an acquisition unit configured to acquire a moving speed of the terminal apparatus and a quality of communication performed by the communication unit; and
an instruction unit configured to determine an execution of a handover based on the quality of communication or the moving speed acquired by the acquisition unit and instruct the communication unit to perform the handover, wherein:
the communication unit is configured to perform a plurality of types of communications including at least guaranteed communication or best-effort communication; and
the instruction unit selects quality of communication as a parameter when guaranteed communication is performed in the communication unit so as to determine the execution of a handover when the quality is lowered to a level below a first threshold, and selects moving speed as a parameter when best-effort communication is performed in the communication unit so as to determine the execution of a handover regardless of quality when an absolute value of variation in the moving speed is larger than a second threshold.

2. The terminal apparatus of claim 1, wherein:
between a first base station apparatus defined in a predetermined communication system and a second base station apparatus defined in the same communication system in which the first base station apparatus is defined, the communication unit communicates with the second base station apparatus of which the transmission power is lower than that of the first base station apparatus; and
the instruction unit determines the execution of a handover to the second base station apparatus regardless of the quality when the moving speed is lower than still another threshold for a predetermined period of time.

3. A communication method, comprising:
communicating with a base station apparatus;
acquiring quality of communication and moving speed of a wireless terminal;
determining to execute a handover based on the acquired quality of communication or the moving speed; and
performing a handover when it is determined to execute the handover, wherein:
the communicating is performed in accordance with a plurality of types of communications including at least guaranteed communication or best-effort communication; and,
in the determining, quality of communication is selected as a parameter when guaranteed communication is performed in the communication unit and a determination is made to execute a handover when the quality is lowered to a level below a first threshold, and moving speed is selected as a parameter when best-effort communication is performed in the communication unit and a determination is made to execute a handover regardless of the quality when an absolute value of variation in the moving speed is larger than a second threshold.

* * * * *